(12) United States Patent
Moeker

(10) Patent No.: US 11,192,520 B2
(45) Date of Patent: Dec. 7, 2021

(54) SEAT BELT DEVICE FOR A VEHICLE SEAT

(71) Applicant: VOLKSWAGEN AKTIENGESELLSCHAFT, Wolfsburg (DE)

(72) Inventor: Carsten Moeker, Ruehen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/001,624

(22) Filed: Aug. 24, 2020

(65) Prior Publication Data

US 2020/0384945 A1 Dec. 10, 2020

Related U.S. Application Data

(63) Continuation of application No. PCT/EP2019/054328, filed on Feb. 21, 2019.

(30) Foreign Application Priority Data

Feb. 22, 2018 (DE) ...................... 10 2018 202 697.1

(51) Int. Cl.
*B60R 22/26* (2006.01)
*B60R 22/28* (2006.01)
*B60R 22/18* (2006.01)

(52) U.S. Cl.
CPC .............. *B60R 22/26* (2013.01); *B60R 22/28* (2013.01); *B60R 2022/1806* (2013.01);
(Continued)

(58) Field of Classification Search
CPC . B60R 22/26; B60R 22/28; B60R 2022/1806; B60R 2022/266;
(Continued)

(56) References Cited

U.S. PATENT DOCUMENTS

| 4,928,992 A | 5/1990 | Qvint et al. |
| 5,897,140 A | 4/1999 | Wier |

(Continued)

FOREIGN PATENT DOCUMENTS

| CA | 2158901 A1 * | 3/1996 | |
| DE | 2244419 A1 * | 3/1974 | ............. B60R 22/28 |

(Continued)

OTHER PUBLICATIONS

Machine translation of DE 2244419 A1, obtained from Espacenet. com Jun. 17, 2021 (Year: 2021).*

(Continued)

*Primary Examiner* — Keith J Frisby
(74) *Attorney, Agent, or Firm* — Muncy, Geissler, Olds & Lowe, P.C.

(57) ABSTRACT

A seat belt device for a vehicle seat, having a seat belt, the belt tongue of which in an engaged state is releasably connected to a seat-side belt buckle. The belt buckle is guided via at least one wire rope through a sleeve-like deflection element, which defines the course of the wire rope between its connection point on the seat side and its connection point on the belt buckle side. The sleeve-like deflection element has a predetermined deformation point, at which the deflection element is deformed in the event of a head-on collision, more specifically with the belt buckle being displaced from its use position into a crash position in which the tilt or twist moments acting on the belt buckle are reduced.

9 Claims, 5 Drawing Sheets

(52) U.S. Cl.
CPC ... *B60R 2022/266* (2013.01); *B60R 2022/281* (2013.01); *B60R 2022/283* (2013.01); *B60R 2022/286* (2013.01)

(58) Field of Classification Search
CPC ........ B60R 2022/281; B60R 2022/283; B60R 2022/286
See application file for complete search history.

(56) References Cited

U.S. PATENT DOCUMENTS

| | | | |
|---|---|---|---|
| 6,094,913 A | 8/2000 | Wier | |
| 6,149,199 A * | 11/2000 | Feile | B60R 22/22 280/801.1 |
| 6,312,057 B1 | 11/2001 | Feile | |
| 6,357,795 B1 | 3/2002 | Krauss et al. | |
| 2009/0273223 A1 * | 11/2009 | Gomi | B60R 22/26 297/481 |
| 2017/0225644 A1 * | 8/2017 | Jaradi | B60R 22/28 |
| 2017/0225649 A1 | 8/2017 | Jaradi et al. | |

FOREIGN PATENT DOCUMENTS

| | | | | |
|---|---|---|---|---|
| DE | 2933048 A1 * | 3/1981 | ............. | B60R 22/26 |
| DE | 3316608 A1 | 11/1984 | | |
| DE | 3319547 A1 * | 12/1984 | ............. | B60R 22/22 |
| DE | 3319547 A1 | 12/1984 | | |
| DE | 4231983 C1 | 3/1994 | | |
| DE | 29702077 U1 | 6/1997 | | |
| DE | 29800909 U1 | 5/1998 | | |
| DE | 19751922 A1 | 6/1999 | | |
| DE | 20200271 U1 | 5/2002 | | |
| DE | 10009422 C2 | 7/2003 | | |
| DE | 102006016574 A1 * | 10/2007 | ......... | B60R 22/1952 |
| DE | 102008029157 A1 | 12/2009 | | |
| DE | 102015105312 A1 * | 10/2016 | ............. | B60R 22/03 |
| DE | 102016015161 A1 * | 5/2017 | ............. | B60R 22/26 |
| EP | 0898527 B1 | 7/2001 | | |
| GB | 1571505 A | 7/1980 | | |
| GB | 2201329 A | 9/1988 | | |

OTHER PUBLICATIONS

Machine translation of DE 2933048 A1, obtained from Espacenet.com Jun. 17, 2021 (Year: 2021).*
Machine translation of DE 102015105312 A1, obtained from Espacenet.com Jun. 17, 2021 (Year: 2021).*
International Search Report dated Apr. 11, 2019 in corresponding application PCT/EP2019/054328.

* cited by examiner

SEAT BELT DEVICE FOR A VEHICLE SEAT

This nonprovisional application is a continuation of International Application No. PCT/EP2019/054328, which was filed on Feb. 21, 2019, and which claims priority to German Patent Application No. 10 2018 202 697.1, which was filed in Germany on Feb. 22, 2018, and which are both herein incorporated by reference.

BACKGROUND OF THE INVENTION

Field of the Invention

The present invention relates to a seat belt device for a vehicle seat.

Description of the Background Art

A vehicle seat can be part of a rear seat bench of a vehicle, which has a middle rear seat as well as side rear seats directly adjacent thereto on both sides in the transverse direction of the vehicle. Each of these rear seats can be formed from a seat part and a backrest and can be mounted on the vehicle floor so as to be longitudinally adjustable in the longitudinal direction of the vehicle, for example, via a rail system. In addition, each of these rear seats is equipped with a seat belt which can be releasably connected to a belt buckle mounted on the side on the rear seat below a seat surface. Due to the extremely small movement gap between the rear seats in the transverse direction of the vehicle, there is a risk that a belt buckle in its non-use state will act as an interference contour if a rear seat directly adjacent thereto is longitudinally adjusted.

A spring-elastic steel cable reinforcement between the cable deflection and the buckle is known from DE 100 09 422 C2, which corresponds to U.S. Pat. No. 6,357,795. This provides a seat belt buckle carrier unit which in a simple manner prevents the occurrence of rattling noises. A belt buckle with a traction cable attached thereto is known from DE 297 02 077 U1, which corresponds to U.S. Pat. No. 6,149,199, and on which an end piece is attached for the vehicle-fixed mounting of the traction cable.

SUMMARY OF THE INVENTION

It is therefore an object of the present invention to provide a seat belt device in which the belt buckle can be reliably positioned in different load situations.

In an exemplary embodiment, a seat belt device is provided that has a sleeve-like deflection element through which a wire rope is guided, which is fastened, on the one hand, to a connection point on the seat side on the vehicle seat and is fastened, on the other hand, to a connection point on the belt buckle side on the belt buckle. The sleeve-like deflection element defines the course of the wire rope between a connection point on the seat side and its connection point on the belt buckle side. With the help of the deflection element, the belt buckle is placed in its non-use state in a stowed position, in which the belt buckle rests flat on a seat surface of the vehicle seat. This ensures that the stowed belt buckle does not act as an interference contour when a vehicle seat directly adjacent thereto is longitudinally adjusted. Due to the defined stowed position of the belt buckle, seat portions of a rear seat bench can therefore be easily adjusted relative to one another in the longitudinal direction without the belt buckles located on the seat surface being able to catch or jam. Such an interaction could damage the belt buckle housing and impair the belt buckle locking function.

The above-mentioned sleeve-like deflection element can be designed to be dimensionally stable in order to keep the belt buckle reliably in its stowed position. Such dimensional stability is disadvantageous insofar as the sleeve-like deflection element is difficult to deflect/position in the direction of the belt force when the seat belt is buckled. As a result, the sleeve-like deflection element (aluminum thimble) causes a pretension on the belt buckle in its use position. The thimble is an aluminum tube that is subsequently pressed over the steel cables, which specifies the desired direction/position for the steel cable or the buckle head for the belt buckle stowed position. The buckle head is therefore mounted under pretension.

By means of the above sleeve-like deflection element, an almost right-angled wire rope deflection results in the stowed state, more specifically in the wire rope course between the sleeve-like deflection element and the belt buckle, as a result of which the belt buckle in its use position is subjected to the aforementioned tilt and/or twist moments due to acting belt forces. Correspondingly, in its use position, the belt buckle constantly has the urge to move towards the stowed position. In order to fasten the seat belt, the belt buckle must be pulled manually from a stowed position into its use position, with the building up of a restoring force. The belt buckle is further pretensioned thereby. This has the result that the belt buckle head rotates and an angular momentum (twist) is generated.

In the event of a head-on collision, the occupant/pelvis thereof moves forward. The pretension/angular momentum increases further steadily on the belt buckle as a result. As a result of this constantly increasing pretensioning and rotating movement, the locking pawl (latching cam) in the belt buckle is temporarily stressed on one side and fails/breaks. This has the result that the tongue slips out of the belt buckle and there no longer is any restraining effect.

The deflection element can have a predetermined deformation point at which the deflection element deforms/breaks up in a head-on collision, more specifically with the belt buckle being displaced from its use position into a crash position in which the tilt or twist moments acting on the belt buckle are reduced. According to the invention, the deflection element, which in itself is very dimensionally stable, is thus designed with a predetermined bending point or predetermined breaking point due to material weakening. The aim of the predetermined deformation point is to bend the sleeve-like deflection element more easily at a predefined tensile force (which occurs in a crash) in order to reduce the pretension/angular momentum on the belt buckle under load. It is achieved in this way that the locking pawl in the belt buckle is stressed/loaded more evenly over the duration of the load (in the event of a crash).

The sleeve-like deflection element can be formed angular with a vertical guide leg and a horizontal guide leg. The wire rope, starting from its lower seat-side connection point, can first be brought upwards out of the deflection element through the vertical guide leg and further through the horizontal guide leg with a wire rope end and fastened to the belt buckle.

The predetermined deformation point can be formed specifically in an inner corner region of the deflection element, a region that is spanned between the vertical guide leg and the horizontal guide leg. In the event of a head-on collision, the wire rope is stretched under the action of the belt force, as a result of which the deflection element is deformed at its predetermined deformation point.

The vehicle seat can be part of a rear seat bench of a vehicle. This rear seat bench can have a middle rear seat as well as at least one further side rear seat adjacent thereto in the transverse direction of the vehicle. The rear seats can be adjusted longitudinally relative to one another in the longitudinal direction of the vehicle.

The sleeve-like deflection element can be a metal thimble, which is pressed onto the wire rope with a press tool. The thimble can preferably be made of an aluminum material. The predetermined deformation point can preferably be formed by drilled holes, perforations, and/or debossings. Alternatively, the predetermined deformation point can have a notch in the material which is formed in the inner corner region between the vertical guide leg and the horizontal guide leg.

Tests have shown that the shape of the predetermined deformation point formed as an indentation/notch/debossing has a major effect on the tear-open behavior of the deflection element (i.e., for example, an aluminum sleeve). Against this background, the predetermined deformation point can be realized in different embodiment variants.

Thus, the predetermined deformation point can be a notch/debossing, which extends in the longitudinal direction of the sleeve-like deflection element. It should be emphasized in addition that the geometry of the notch/debossing can be designed differently. It can be rounded, wedge-shaped, perforated, or trapezoidal, for example.

The predetermined deformation point can be introduced, for example, completely circumferential or only partially circumferential in the sleeve-like deflection element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
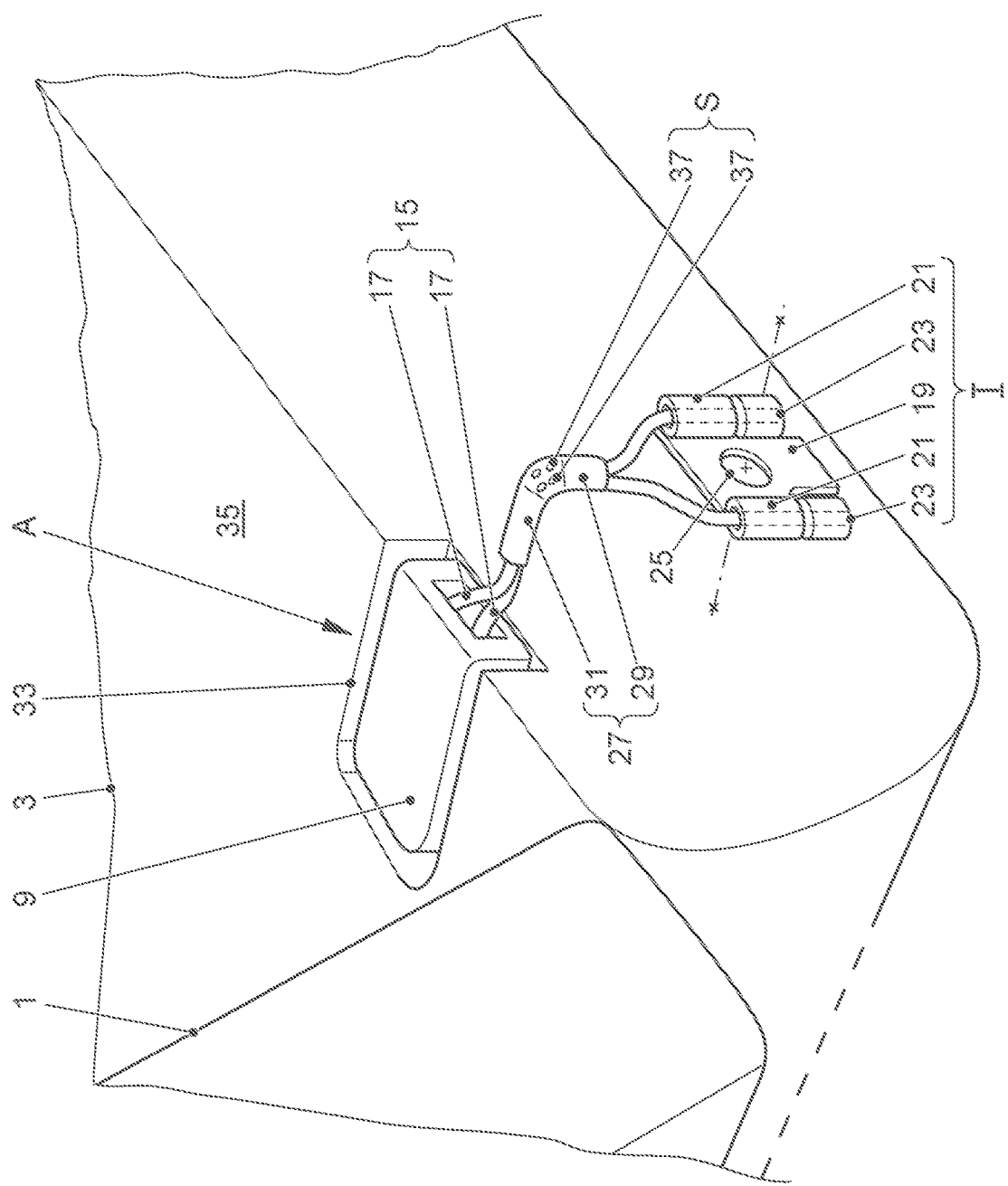
FIG. 1 shows in a perspective partial view a vehicle seat whose belt buckle is in a stowed position.
Figure 2:
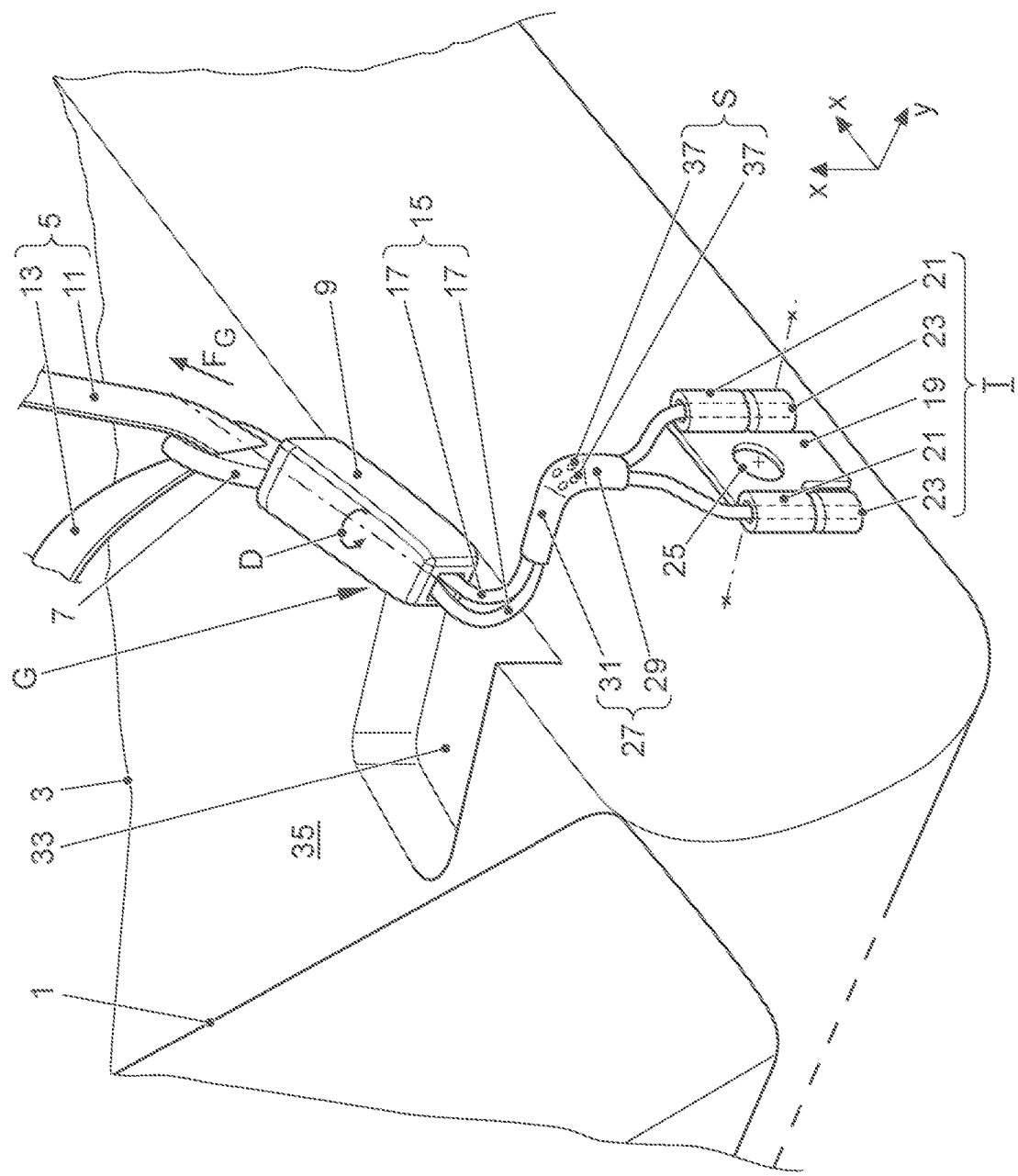
FIGS. 2 and 3 each show views corresponding to FIG. 1, in which the belt buckle is in a use position and in a crash position.

In FIG. 1, a vehicle seat with a backrest 1 and a seat part 3 is shown in a partial perspective diagram. A seat belt device is associated with the vehicle seat and has a three-point seat belt 5 (FIG. 2), the belt tongue 7 of which is releasably engaged in a belt buckle 9 (FIG. 2). The three-point seat belt 5 is composed of a shoulder belt part 11 and a lap belt part 13, which merge into one another in one piece at belt tongue 7.

In FIG. 1, belt buckle 9 is fastened on the bottom side via a wire rope 15 to a supporting structure (not shown) of the vehicle seat. Wire rope 15 is looped around an eyelet (not shown) inside belt buckle 9, wherein two loop parts 17 of wire rope 15 extend over a predetermined rope length to a seat-side connection point I. In FIG. 1, seat-side wire rope connection point I is designed as a plate holder 19 which has two lateral receiving channels 21 through which the two lower rope ends are guided. Each of the two rope ends has a thimble 23 which is designed to be larger in diameter than the two receiving channels 21 of plate holder 19. Plate holder 19 also has a screw hole 25 approximately in the middle, via which plate holder 19 can be fastened to the vehicle seat support structure.

As can also be seen from FIG. 1, the two wire rope loops 17 are guided through a sleeve-shaped deflection element 27 which defines the course of wire rope 15 between its seat-side connection point I and its belt-buckle-side connection point. In the exemplary embodiment shown, the sleeve-like deflection element 27 is an aluminum thimble which is pressed onto wire rope 15 with a press tool. The sleeve-like deflection element 27 is formed angular in the figures with a vertical guide leg 29 and a horizontal guide leg 31, so that the two wire rope loops 17, starting from their seat-side connection point I, first extend through vertical guide leg 29 and further through horizontal guide leg 31 up to belt buckle 9. In this way, the sleeve-like deflection element 27 places belt buckle 9 in its non-use state in a stowed position A (FIG. 1), in which belt buckle 9 rests flat in a receiving recess 33 of seat surface 35 of the vehicle seat. This reliably prevents belt buckle 9, which is in its non-use state, from acting as an interference contour during a longitudinal adjustment of a vehicle seat (not shown) that is directly adjacent to it.

In FIG. 2, belt buckle 9 is shown in its use position G, in which belt tongue 7 is inserted into belt buckle 9. Such a use position G arises during the normal driving of the vehicle. In this case, belt buckle 9 is inclined laterally outward in an inclined position in the vehicle transverse direction y. The use position G shown in FIG. 2 is imposed by the sleeve-like, dimensionally stable deflection element 27 and when belt forces $F_G$ are applied results in belt buckle 9 being subjected to tilt/twist moments D. In the state of the art, such tilt/twist moments D are to be taken into account when designing belt buckle 9 in order to ensure a secure connection between belt tongue 7 and belt buckle 9 even in the event of a head-on collision.

Figure 3:
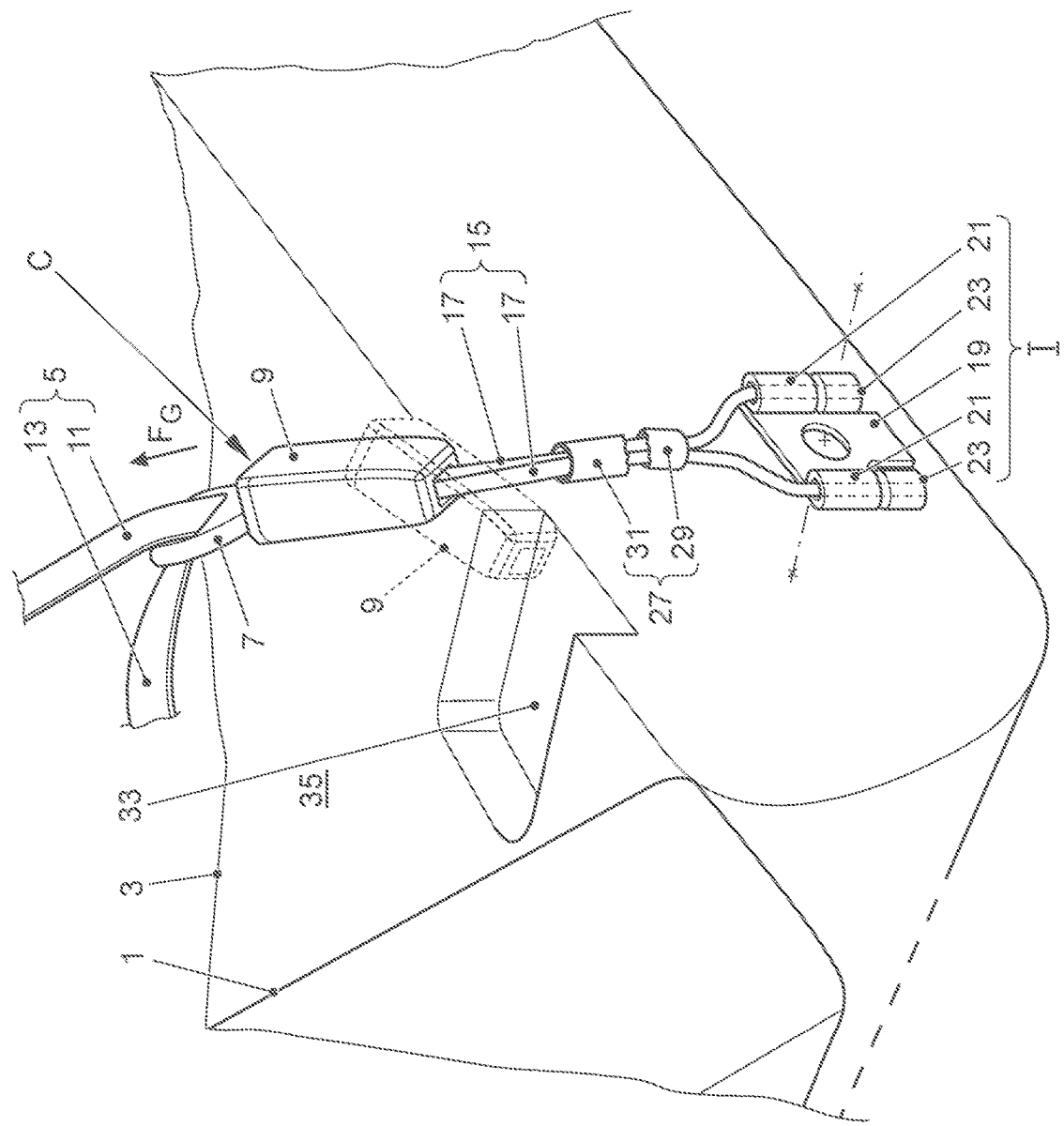

According to the invention, the sleeve-like deflection element 27 shown in the figures has a predetermined breaking point S at the transition between its vertical guide leg 29 and its horizontal guide leg 31. In the event of a head-on collision, wire rope 15 guided through sleeve-like deflection element 27 is stretched under the effect of the greatly increased belt force $F_G$ due to the crash, as indicated in FIG. 3, as a result of which the sleeve-like deflection element 27 breaks open at its predetermined breaking point S. In this way, belt buckle 9 is shifted from its use position (FIG. 2 and indicated by dashed lines in FIG. 3) into an additional crash position C, in which the tilt or twist moments D acting on belt buckle 9 are reduced.

Figure 4:
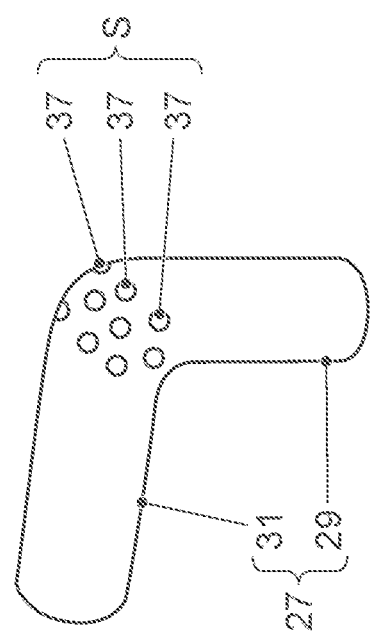

In FIG. 4, the sleeve-like deflection element 27 is shown separately. Accordingly, the predetermined breaking point S has drilled holes or perforations 37 distributed circumferentially in the circumferential direction. Alternatively and/or in addition, any debossings can also be formed at the predetermined breaking point S.

Figure 5:
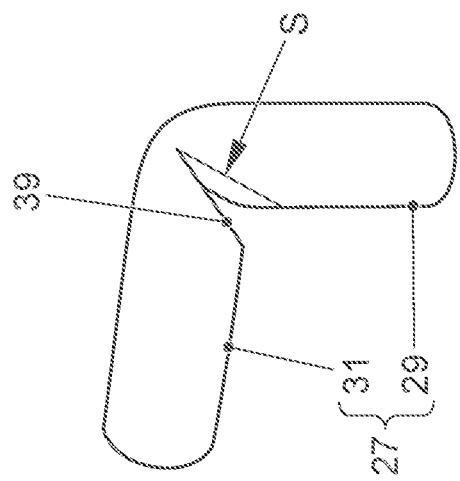
FIGS. 4 to 7 each show different exemplary embodiments of the sleeve-like deflection element.

In FIG. 5, the sleeve-like deflection element 27 is shown in a further embodiment variant in which, instead of drilled holes, an approximately wedge-shaped notch 39 in the material is formed at the inner corner region between vertical guide leg 29 and horizontal guide leg 31.

Figure 7:
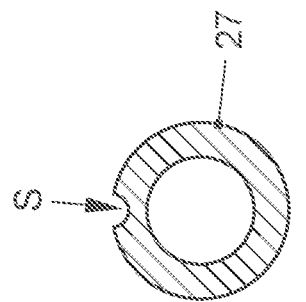
Figure 6:
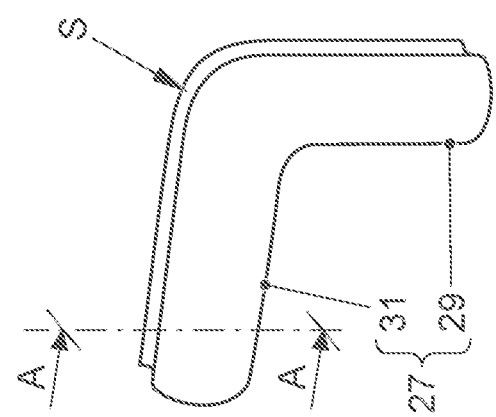

In FIGS. 6 and 7, the sleeve-like deflection element 27 is shown with a predetermined deformation point S, which is formed as a notch/debossing on the outer circumference of deflection element 27. The notch/debossing extends completely continuously in the longitudinal direction both in vertical guide leg 29, in horizontal guide leg 31, and in the outer corner region between the two legs 29, 31. In FIG. 7, a groove geometry of the notch/debossing is shown as an example. Accordingly, the groove geometry is shown rounded. The invention is not limited to the groove geometry shown in FIG. 7, however. Instead of this, the notch/debossing can also have a rounded, wedge-shaped, perforated, or trapezoidal cross-sectional geometry.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A seat belt device for a vehicle seat, the seat belt device comprising:
   a seat belt;
   a belt tongue of the seat belt, in an engaged state, is releasably connected to a seat-side belt buckle; and
   a sleeve-like deflection element,
   wherein the belt buckle is attached to the vehicle seat by at least one wire rope, the at least one wire rope being guided through the sleeve-like deflection element such that a course of the wire rope is defined between a seat-side connection point and a belt-buckle-side connection point,
   wherein, in a non-use state, the sleeve-like deflection element places the belt buckle in a stowed position in which the belt buckle rests flat on a seat surface of the vehicle seat, and in an engaged state, the sleeve-like deflection element places the belt buckle in a use position in which the belt buckle is acted on by tilt and/or twist moments on account of acting belt forces,
   wherein a portion of the sleeve-like deflection element has a material weakening that forms a predetermined deformation point, such that in a head-on collision the sleeve-like deflection element deforms to shift the belt buckle from the use position into a crash position in which the tilt and/or twist moments acting on the belt buckle are reduced.

2. The seat belt device according to claim 1, wherein the sleeve-like deflection element is formed angular with a vertical guide leg and a horizontal guide leg, and wherein the wire rope, starting from the seat-side connection point, is first brought upwards out of the sleeve-like deflection element through the vertical guide leg and further through the horizontal guide leg with a wire rope end and fastened to the belt buckle.

3. The seat belt device according to claim 2, wherein the predetermined deformation point of the sleeve-like deflection element is between the vertical guide leg and the horizontal guide leg.

4. The seat belt device according to claim 2, wherein the predetermined deformation point has a notch at an inner corner region of the sleeve-like deflection element between the vertical guide leg and the horizontal guide leg.

5. The seat belt device according to claim 1, wherein, in the event of the head-on collision, the wire rope is stretched under the action of belt forces, as a result of which the sleeve-like deflection element is deformed or breaks apart at the predetermined deformation point.

6. The seat belt device according to claim 1, wherein the vehicle seat is part of a rear seat bench of a vehicle, the rear seat bench having a middle rear seat part as well as side rear seat parts adjacent thereto in a transverse direction of the vehicle, and wherein the rear seat parts are adjusted relative to one another in a longitudinal direction of the vehicle, and wherein the vehicle seat is the middle rear seat part.

7. The seat belt device according to claim 1, wherein the sleeve-like deflection element is a metal thimble which is pressed onto the wire rope with a press tool.

8. The seat belt device according to claim 1, wherein the predetermined deformation point has drilled holes, perforations, and/or debossings.

9. The seat belt device according to claim 1, wherein due to the material weakening, the sleeve-like deflection element deforms and breaks apart at the predetermined deformation point in the head-on collision.

* * * * *